April 24, 1934.   L. NEUBERGER   1,956,130
MANUFACTURE OF TOASTED BREAD WAFERS
Filed Sept. 8, 1932   5 Sheets-Sheet 3

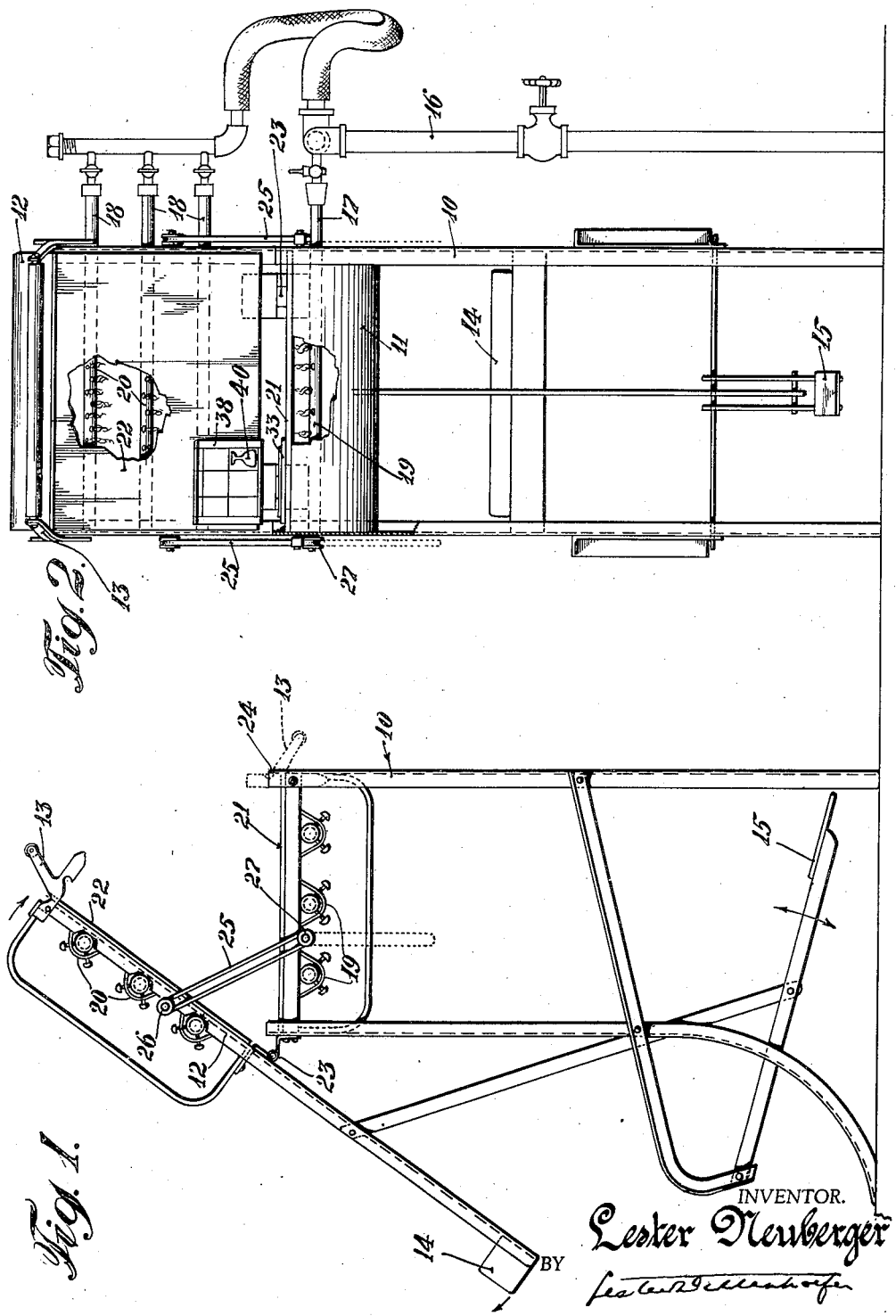

INVENTOR.
Lester Neuberger
BY
ATTORNEY.

April 24, 1934.                L. NEUBERGER                  1,956,130
                    MANUFACTURE OF TOASTED BREAD WAFERS
                        Filed Sept. 8, 1932        5 Sheets-Sheet 4
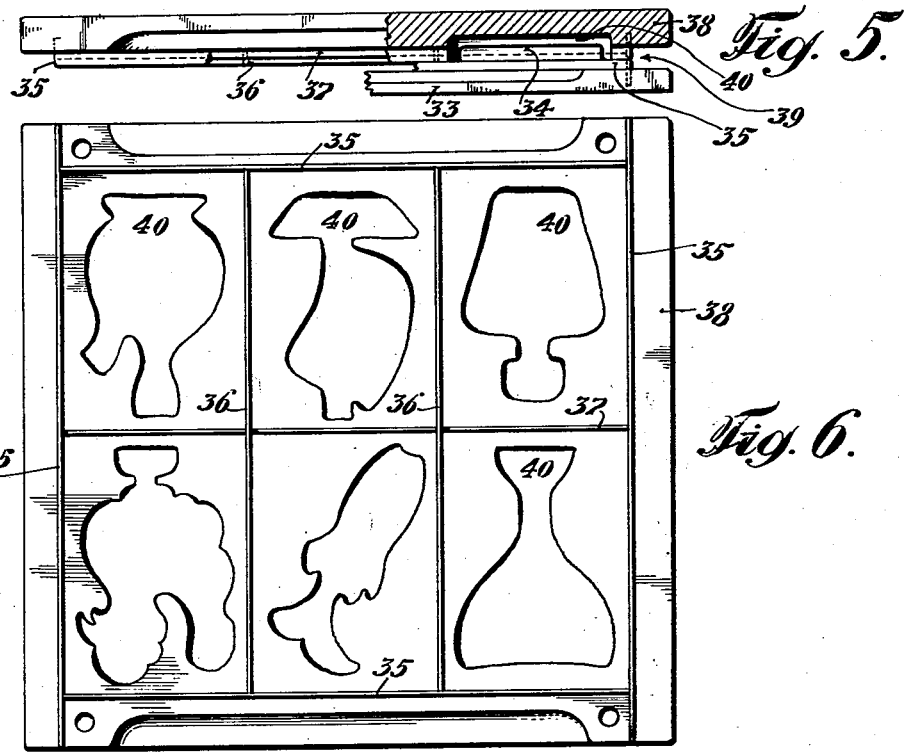
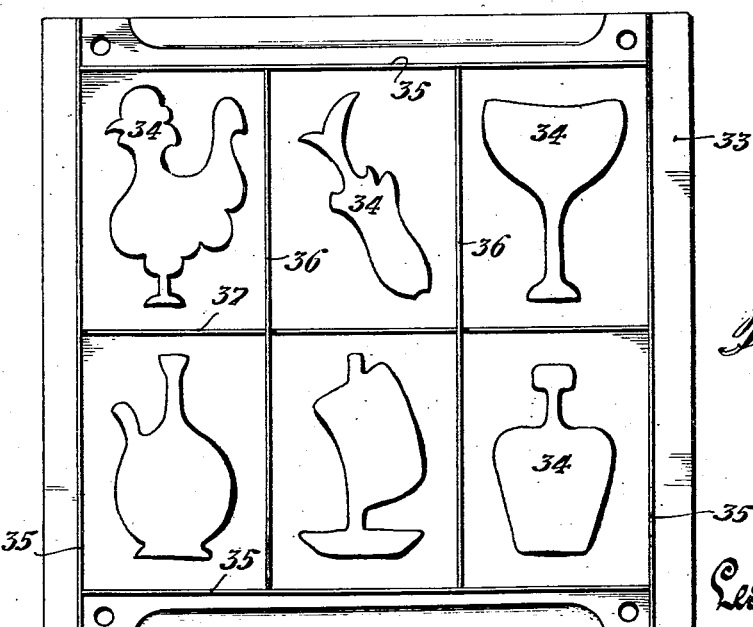
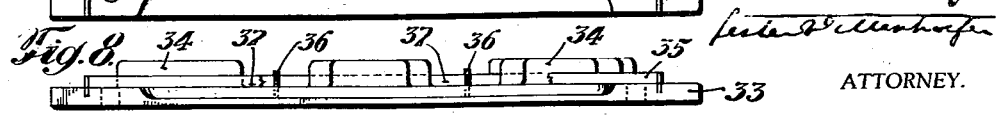
INVENTOR.
Lester Neuberger
ATTORNEY.

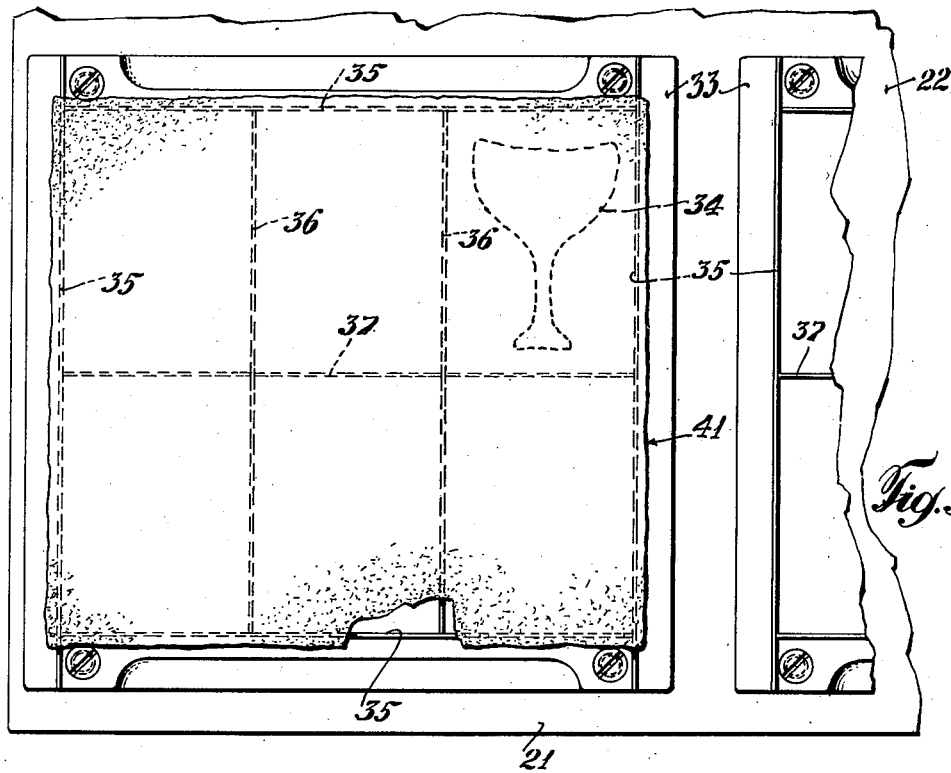
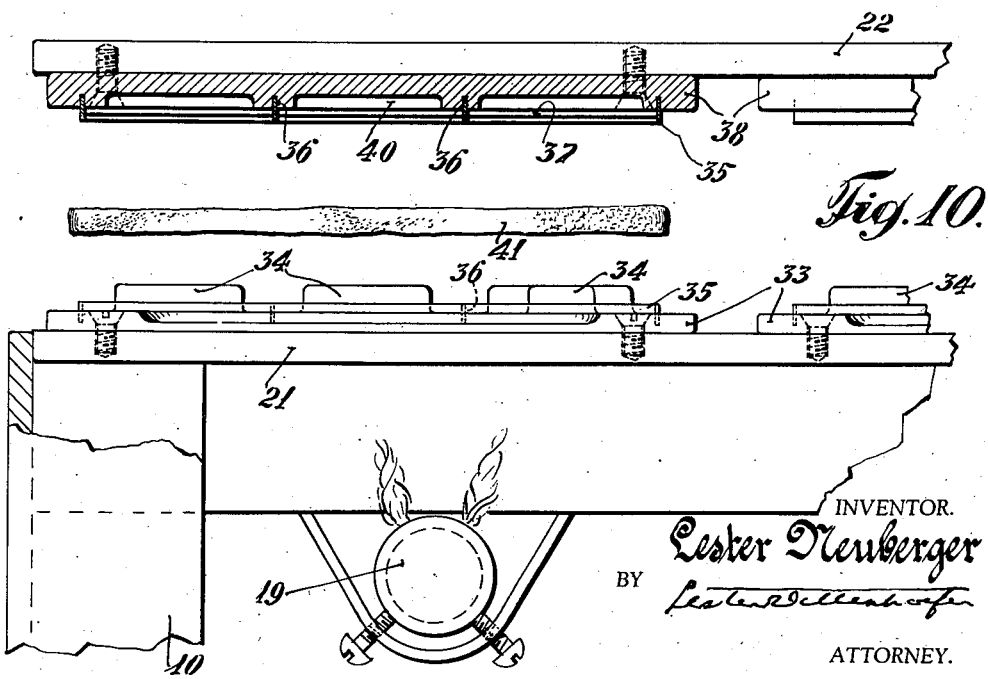

Patented Apr. 24, 1934

1,956,130

UNITED STATES PATENT OFFICE 1,956,130

MANUFACTURE OF TOASTED BREAD WAFERS

Lester Neuberger, New York, N. Y., assignor to Devon Bakeries, Inc., New York, N. Y.

Application September 8, 1932, Serial No. 632,260

2 Claims. (Cl. 99—10)

This invention relates to the manufacture of toasted bread wafers in which is impressed an intaglio or a definite decorative form. The invention further relates to a method and apparatus for manufacturing an article of this class, as well as to the product itself.

One of the objects of my invention is to provide apparatus wherein slices of bread may be inserted, which slices are compressed by certain dies or molds forming impressions therein, the bread being compacted and toasted while in contact with such dies or molds so that the finished article is a relatively thin toasted bread wafer in which is embedded the particular design of the die or mold.

Another object is to provide a method of manufacturing a toasted bread wafer in which the bread is toasted while in contact with particular shape-forming dies or molds, so that when the process is completed, the finished article is a toasted form of bread having impressed therein a design of permanent shape.

This article, which in itself is also a part of my invention, is intended for use by housewives for serving caviar or other delicacies, the caviar or other filling being inserted in the impressions which are preferably in the form of some ornamental object.

For a description of my invention, I shall refer to the drawings: wherein:—

Figure 1 is a side view of my improved apparatus, showing the top or cover in open position;

Fig. 2 is a front view of the same, with parts broken away;

Fig. 5 is an end view, partly in section, of the top plate of the die in its relation to a portion of the bottom plate;

Fig. 6 is a plan view of the top plate;

Fig. 7 is a similar plan view of the bottom plate;

Fig. 8 is an end view of the same;

Fig. 9 shows the relation of the bread to the bottom plate as it is placed thereon;

Fig. 10 is a view showing the relationship of the bread to the bottom plate and the top heating plate;

Figure 3:
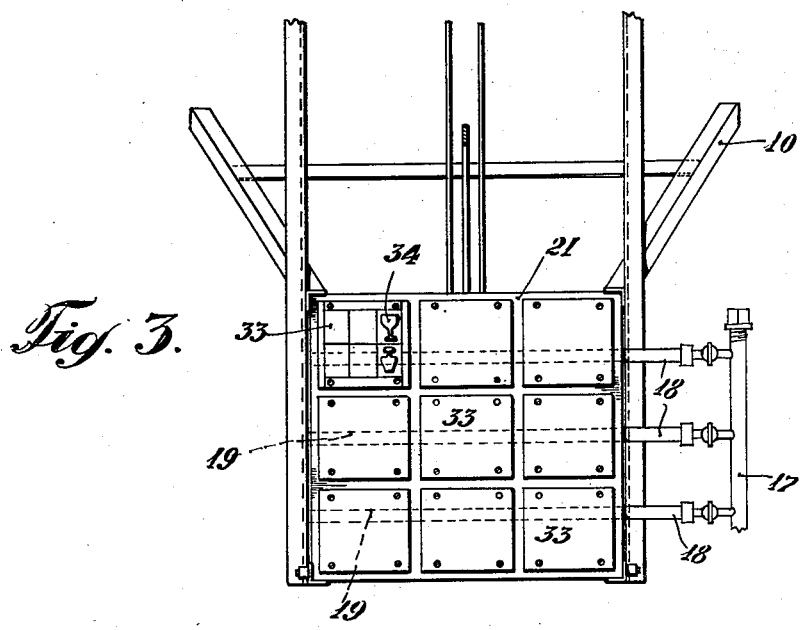
Fig. 3 is a plan view of the bottom half of the apparatus with the top removed.

Referring now more particularly to the drawings, and especially to Fig. 1, the reference character 10 indicates the apparatus in general. The apparatus is provided with a toasting oven comprising a bottom portion 11 equipped with a movable top or cover 12 adapted to be fastened to the bottom portion by a handle latch 13 in a manner hereinafter described. The cover is counterbalanced by a weight 14 so that it may be easily raised or lowered into open or closed position. 15 is a foot pedal connected with the cover by a suitable leverage and operating, upon depression of the pedal, to throw the cover into open position as shown in Fig. 1, in which position the oven is ready to be loaded with slices of prebaked bread.

Figure 4A:
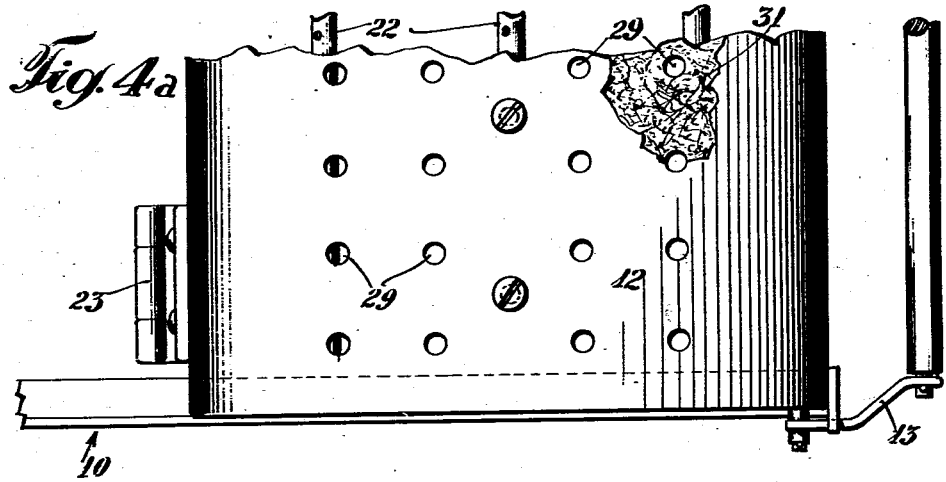
Fig. 4a is a top view of the toasting oven of Fig. 4 partly broken away.

Any desired means may be provided for heating the oven with gas, electricity or otherwise. In the present instance, as will be seen on referring to Figs. 2, 4 and 4a, the oven is heated by gas which enters through the main 16 and is distributed through a series of pipes 17 and 18 to a series of burners 19 and 20. The burners 19 are disposed below the heating plate 21 in the lower portion 11, while the burners 20 are disposed above the heating plate 22 of the cover portion 12.

Figure 4:
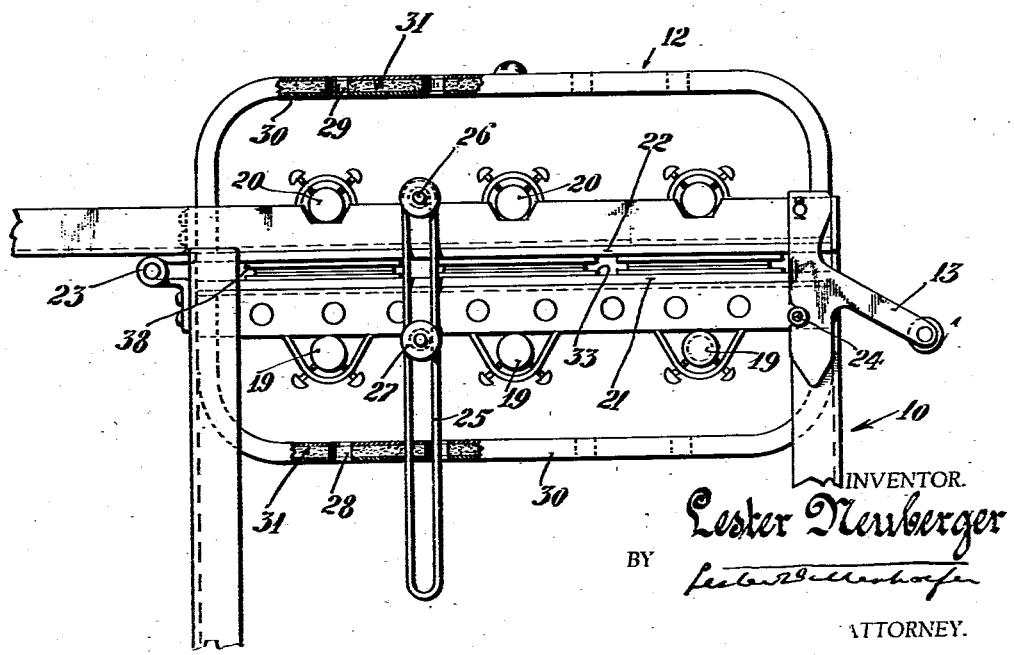
Fig. 4 is a detailed side view, partly in section, showing the top or cover in closed position.

As shown in Fig. 4, the top portion or cover 12 of the toasting oven is hinged to the bottom portion at point 23, and is locked in operative relation to the bottom portion by the handle latch mechanism 13 cooperating with a locking stud 24 so as to cause the cover portion to press firmly and tightly against the bottom portion. For limiting the movement of the cover relative to the lower portion, a longitudinally cut out slide member 25 is utilized, this slide cooperating with studs 26 and 27 secured to the top and bottom portions of the apparatus in a manner which will be apparent from a review of Figs. 1 and 4. Preferably, also, the oven is equipped with heat outlet holes 28 on the bottom portion, and similar holes 29 on the top portion. The hood of the oven may be made of sheet metal, designed to form a hollow structural body 30 which may be filled or lined with insulating material, such as asbestos, denoted by reference numeral 31.

Referring now to Fig. 3 and Figs. 5 to 10 inclusive, the oven is adapted to house a series of male dies or molds on its bottom portion, and a series of female dies or molds on its upper portion, said dies or molds being supported on the lower and upper heating plates 21 and 22 respectively. Fig. 3 discloses and illustrates the position of the lower or male dies or molds relatively to the bottom heating plate, these male dies or molds being denoted by the reference numeral 33 and having formed thereon the raised decorative shapes indicated by reference numeral 34. Figs. 7 and 8 illustrate more clearly one of these male dies or molds 33 having various decorative shapes thereon, such as a fish, a goblet, etc., and formed with a plurality of cutting ribs 35 extending around the edges and lengthwise thereon, as well as relatively shallow ribs adapted to create merely a score or weakened line in the finished toasted bread form, running crosswise of the die and denoted by reference numeral 37.

Each male die cooperates with a female die 38 illustrated in Fig. 6 and shown with relation to the male die in Fig. 5. The female die 38 is constructed in the usual manner of dies of this type and forms with the bottom die a space 39, adapted to be occupied by the main portion of the slice of bread and depressed portions 40, which latter correspond in configuration to the shaping portions 34 of the companion male dies. It is to be noted that these dies are constructed particularly for operation on a relatively flexible or pliable material like bread, rather than a flowing plastic material like batter or dough.

Figs. 9 and 10 illustrate how the slice of bread 41 is applied to the bottom heating plate containing the dies 33, and the manner in which the top half of the apparatus containing the dies 38 is brought down to cooperate therewith. In certain instances where it is desired merely to impress the design in one surface of the bread, the female dies 38 may be omitted.

The present apparatus, as shown, is equipped with nine sets of dies so as to operate upon nine slices of bread at one time, but it will be understood, of course, that a greater or lesser number of die sets may be used.

In carrying out my invention, a loaf of bread is cut into slices 41 of considerable greater thickness than the thickness of the finished product 42, each slice being of such size as to lie beyond the die on all four sides thereof so that the outer cutting ribs 35 will remove the entire crust while the inner cutting ribs 36 will cut each slice into three parts, each part having two impressions therein and being separated by a scored or weakened line 44 which line is formed in the product by the transverse rib 37.

During the process of manufacture, the slices of bread are compacted, toasted and thoroughly de-hydrated by the heat and pressure of the dies, which dies also form impressions 43 of uniform thickness and ornamental design in the product.

Figure 11:
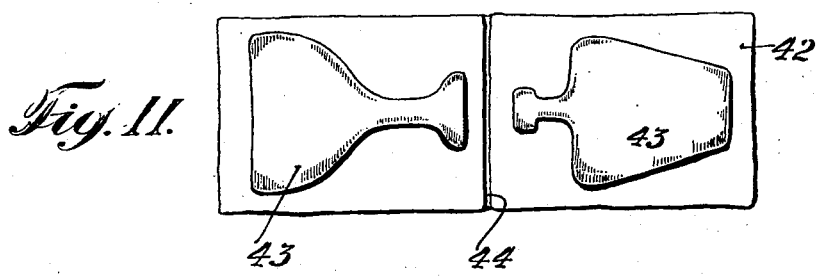
Fig. 11 is a plan view of the toasted bread wafer.
Figure 12:
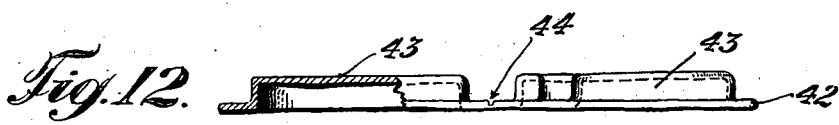
Fig. 12 is a side view, partly in section, illustrating the same.

The resultant product, shown in Figs. 11 and 12, is a flat, hard and crisp toasted bread wafer having a recess permanently impressed therein in the form of an ornamental design. In these figures I have shown the product in the position in which it is removed from the dies, but it is to be understood that it is used in reversed position so that the recesses 43 will form pockets or compartments for receiving and holding a suitable edible filling material such as caviar, cheese, paste or other food substance. For convenience in handling and packing, I prefer to make the product in the form of two wafers connected by a scored line 44 which permits of their being easily broken apart into individual units by the user.

While I have shown a particular embodiment of the apparatus, it should be understood that I do not wish to be limited in construction except as defined by the claims appended hereto. Moreover, it should be understood that my invention covers the process of manufacturing a product of the type described, and the product per se, regardless of the particular apparatus involved.

What I claim is:

1. As a new article of manufacture, an ornamental flat, hard, crisp and toasted biscuit of wafer-like thinness formed from an integral slice of bread crumb and having an intermediate depressed portion of substantial area for the reception of an edible filling, said crumb being substantially uniformly compressed transversely of the slice, the biscuit having a plate-like surface texture throughout.

2. As a new article of manufacture, a flat, hard, crisp and toasted biscuit of wafer-like thinness formed from an integral slice of bread crumb uniformly compressed transversely thereof, one surface of said biscuit having a depressed portion within the confines of its perimeter, the portion being of substantial area to receive a quantity of edible filling.

LESTER NEUBERGER.